United States Patent
Ishikawa et al.

(10) Patent No.: US 11,255,286 B2
(45) Date of Patent: Feb. 22, 2022

(54) INJECTION CONTROL DEVICE

(71) Applicant: DENSO CORPORATION, Kariya (JP)

(72) Inventors: Yasumasa Ishikawa, Kariya (JP); Masashi Inaba, Kariya (JP); Kosuke Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/353,140

(22) Filed: Jun. 21, 2021

(65) Prior Publication Data

US 2021/0404401 A1    Dec. 30, 2021

(30) Foreign Application Priority Data

Jun. 29, 2020   (JP) .............................. JP2020-111593

(51) Int. Cl.
*F02D 41/20*   (2006.01)
*F02D 41/26*   (2006.01)
*F02D 41/40*   (2006.01)

(52) U.S. Cl.
CPC ............. *F02D 41/20* (2013.01); *F02D 41/26* (2013.01); *F02D 41/402* (2013.01); *F02D 2041/2048* (2013.01)

(58) Field of Classification Search
CPC ........ F02D 41/20; F02D 41/26; F02D 41/402; F02D 2041/2048
See application file for complete search history.

(56) References Cited

U.S. PATENT DOCUMENTS

| | | | | |
|---|---|---|---|---|
| 10,267,252 | B2* | 4/2019 | Nakano | F02D 41/402 |
| 10,352,264 | B2* | 7/2019 | Mukaihara | F02D 41/2448 |
| 10,428,757 | B2* | 10/2019 | Moriyama | F02D 41/2467 |
| 2004/0144362 | A1* | 7/2004 | Nakano | F02D 31/007 123/352 |
| 2005/0217256 | A1* | 10/2005 | Okugawa | F01N 9/002 60/295 |
| 2008/0167786 | A1* | 7/2008 | Sasaki | F02D 35/023 701/102 |
| 2009/0063013 | A1* | 3/2009 | Nakata | F02D 41/3809 701/103 |
| 2011/0088657 | A1* | 4/2011 | Tanno | F02D 19/0649 123/305 |
| 2017/0002765 | A1* | 1/2017 | Nakano | F02D 41/2467 |
| 2017/0009689 | A1* | 1/2017 | Imai | F02D 41/402 |
| 2020/0284214 | A1 | 9/2020 | Inaba et al. | |

FOREIGN PATENT DOCUMENTS

JP    2016-033343 A    3/2016

* cited by examiner

*Primary Examiner* — Joseph J Dallo
*Assistant Examiner* — Kurt Philip Liethen
(74) *Attorney, Agent, or Firm* — Posz Law Group, PLC (57) ABSTRACT

An injection control device includes: an area correction unit that calculates an energization time correction amount by performing area correction of a current flowing through a fuel injection valve when executing a current drive of a fuel injection valve to inject a fuel from the fuel injection valve in a multi-stage injection; and a change unit that changes an upper limit guard value of the energization time correction amount according to an injection time of the multi-stage injection during control of the multi-stage injection.

6 Claims, 6 Drawing Sheets

INJECTION CONTROL DEVICE

CROSS REFERENCE TO RELATED APPLICATION

The present application claims the benefit of priority from Japanese Patent Application No. 2020-111593 filed on Jun. 29, 2020. The entire disclosure of the above application is incorporated herein by reference.

TECHNICAL FIELD

The present invention relates to an injection control device that controls opening and closing of a fuel injection valve.

BACKGROUND

An injection control device is used to inject fuel into an internal combustion engine by opening and closing a fuel injection valve. The injection control device opens the fuel injection valve that is electrically drivable by passing current to the fuel injection valve. In recent years, a normal current profile for energization current based on a command injection quantity has been set, and the injection control device opens the fuel injection valve by applying current to the fuel injection valve on the basis of the normal current profile. The normal current profile is also referred to as a nominal current profile or an ideal current profile. In recent years, due to tightening of regulations for environmental problems, further improvement in the fuel injection accuracy in automobiles has been required as measures to improve fuel efficiency and reduce the amount of harmful substance emission. In particular, since there is a requirement for tightening regulations on the number of fine particles (i.e., PN, that is Particulate Number), fine injection is frequently used, and higher injection accuracy is required.

SUMMARY

According to an example embodiment, an injection control device includes: an area correction unit that calculates an energization time correction amount by performing area correction of a current flowing through a fuel injection valve when executing a current drive of a fuel injection valve to inject a fuel from the fuel injection valve in a multi-stage injection; and a change unit that changes an upper limit guard value of the energization time correction amount according to an injection time of the multi-stage injection during control of the multi-stage injection.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

If the gradient of the energization current of the fuel injection valve becomes lower than the gradient of the normal current profile due to various factors such as a peripheral temperature environment and aged deterioration, an actual injection quantity may be largely reduced from the command injection quantity, which may result in deterioration of an A/F value and accidental fire. In order to prevent such problems, it is desirable to previously adjust an energization command time for energization to the fuel injection valve to a rather long time factoring in variations. However, if the rather long energization command time is ensured, the fuel efficiency may be reduced.

In view of this, the applicant of the present application proposes a so-called area correction technique that corrects the energization time on the basis of an integrated current difference between an integrated current of the normal current profile serving as a target current to reach a target peak current and an integrated current of detected current. From the background of this technological development, the inventors are studying to prevent overcorrection of control, especially at the time of multi-stage injection control.

In view of the above points, an injection control device is provided to be capable of preventing overcorrection of control during multi-stage injection control.

According to an aspect of the present embodiments, an area correction unit calculates an energization time correction amount by performing area correction on a current flowing through a fuel injection valve in current-driving the fuel injection valve to cause the fuel injection valve to inject fuel. Since the changing unit changes the upper limit guard value of the energization time correction amount according to the injection times during the multi-stage injection control, it is possible to prevent overcorrection of the control during the multi-stage injection control.

Figure 1:
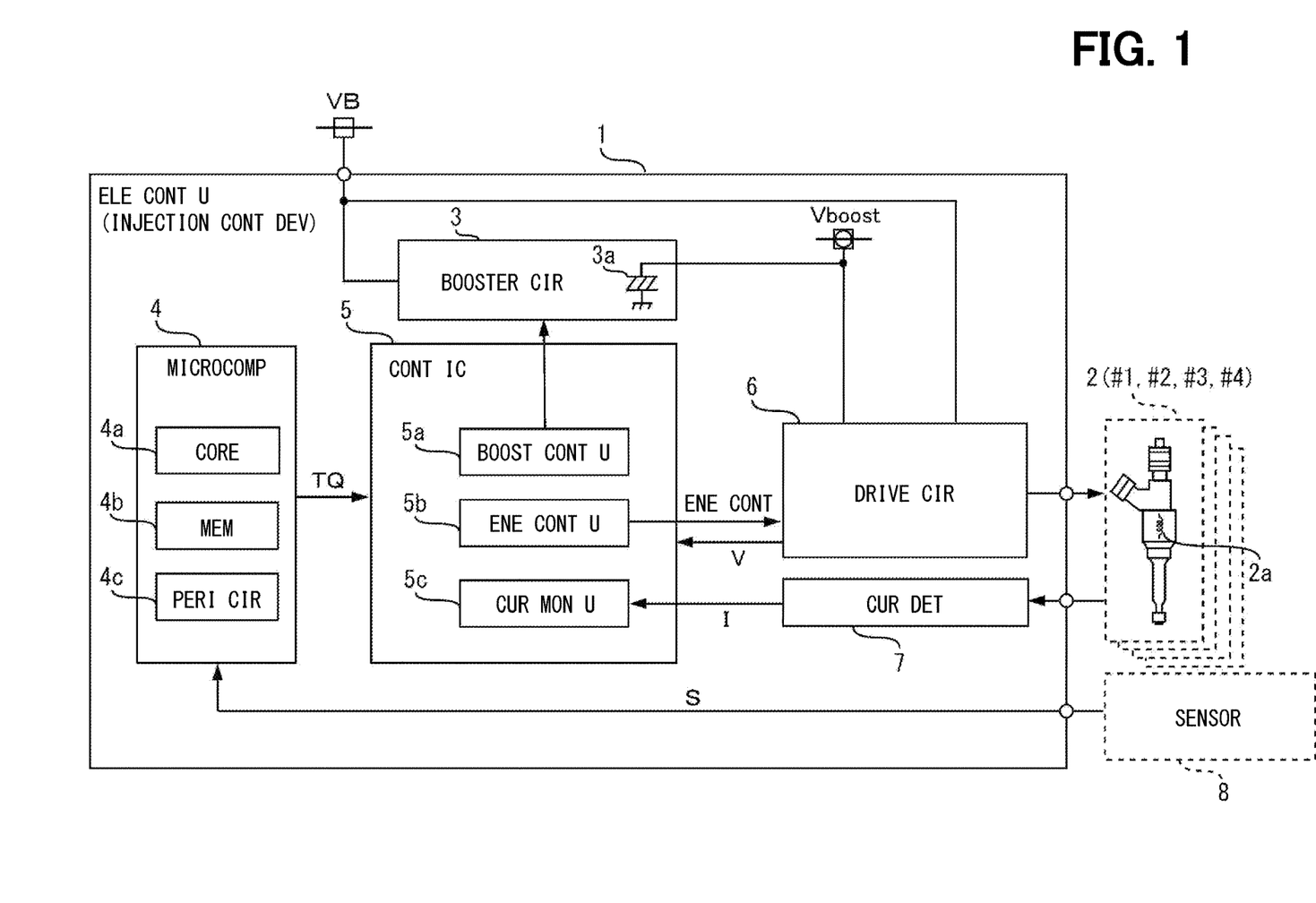
FIG. 1 is the electrical configuration diagram of an injection control device in a first embodiment.

Hereinbelow, some embodiments of an injection control device will be described with reference to the drawings. As illustrated in FIG. 1, an electronic control unit (ECU) 1 as a fuel injection control device is configured as, for example, an injection control device which drives a solenoid fuel injection valve 2. The fuel injection valve 2 directly injects fuel into an internal combustion engine mounted on a vehicle such as an automobile. The fuel injection valve 2 is also called an injector. Hereinbelow, a mode in which the present invention is applied to the electronic control unit 1 for gasoline engine control will be described. However, the present invention may also be applied to an electronic control unit for diesel engine control. FIG. 1 illustrates the fuel injection valves 2 for four cylinders. However, the present invention can also be applied to three cylinders, six cylinders, or eight cylinders.

As illustrated in FIG. 1, the electronic control unit 1 has an electrical configuration including a booster circuit 3, a microcomputer 4, a control IC 5, a drive circuit 6, and a current detector 7. The microcomputer 4 includes one or more cores 4a, a memory 4b such as a ROM and a RAM, and a peripheral circuit 4c such as an A/D converter, and performs various control operations in accordance with a program stored in the memory 4b and sensor signals S acquired from various sensors 8.

Although not illustrated, the sensors 8 for a gasoline engine include, for example, a crank angle sensor which outputs a pulse signal every time a crank shaft rotates by a predetermined angle, an air intake amount sensor which detects the air intake amount, a fuel pressure sensor which detects the pressure of fuel injected into the engine, an A/F sensor which detects an air-fuel ratio, that is, an A/F value of the internal combustion engine, and a throttle opening sensor which detects a throttle opening.

The microcomputer 4 calculates an engine speed from the pulse signal of the crank angle sensor and acquires the throttle opening from a throttle opening signal. The microcomputer 4 calculates a target torque required for the internal combustion engine on the basis of the throttle opening, a hydraulic pressure, and the A/F value, and calculates a required injection quantity serving as a target on the basis of the target torque.

The microcomputer 4 calculates an energization command time Ti of an instruction TQ on the basis of the required injection quantity serving as a target and the fuel pressure detected by the fuel pressure sensor. The microcomputer 4 calculates injection start instruction time t0 for each of cylinders #1 to #4 on the basis of the sensor signals S input thereto from the various sensors 8 described above and outputs the instruction TQ for fuel injection to the control IC 5 at the injection start instruction time t0.

The control IC 5 is an integrated circuit device such as an ASIC and includes, for example, a logic circuit, a control main body such as a CPU, a storage unit such as a RAM, a ROM, or an EEPROM, and a comparator (all of which are not illustrated). The control IC 5 is configured to execute various control operations using hardware and software. The control IC 5 has functions of a boost control unit 5a, an energization control unit 5b, and a current monitoring unit 5c.

Figure 2:
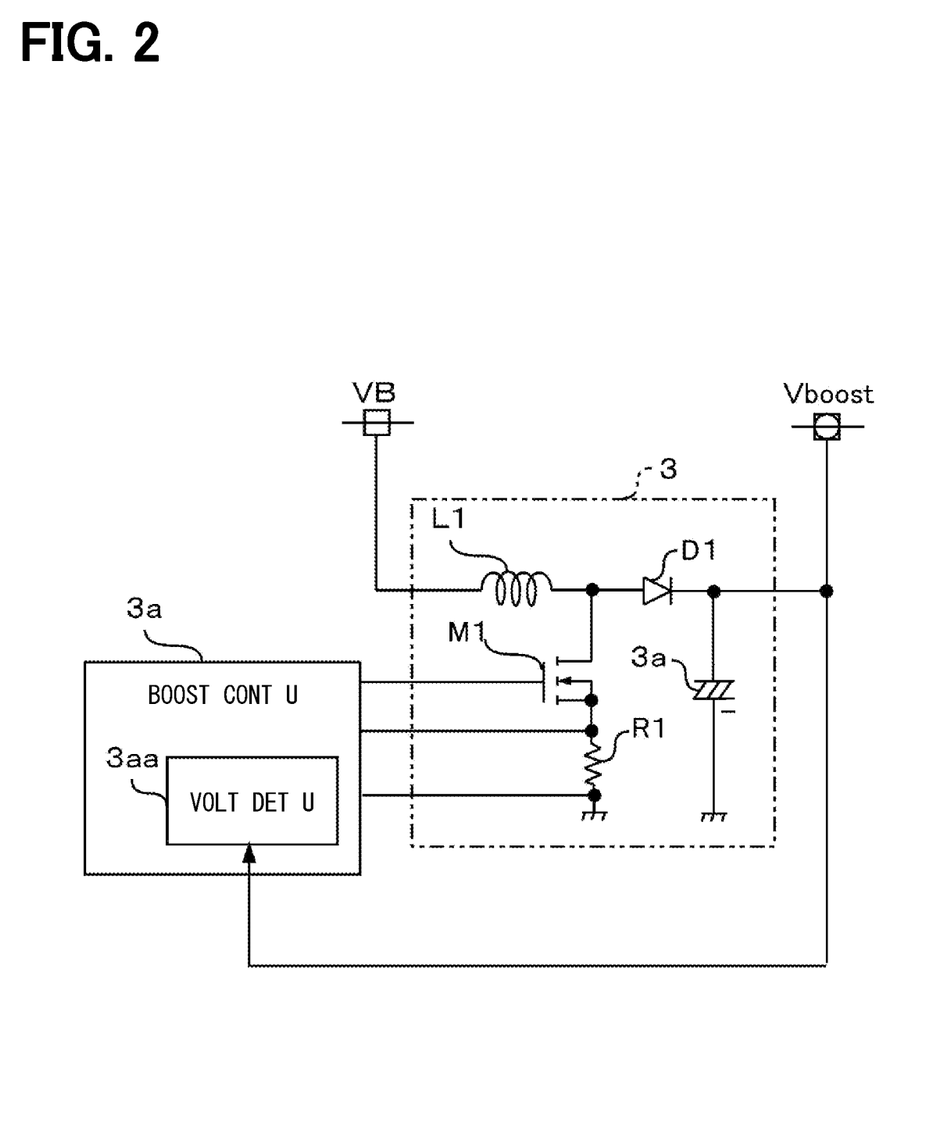
FIG. 2 is the electrical configuration diagram of a booster circuit.

As illustrated in FIG. 2, the booster circuit 3 includes a boost DC-DC converter including an inductor L1, a switching element M1, a diode D1, a current detection resistor R1, and a charging capacitor 3a which are connected to each other as illustrated in FIG. 2. The booster circuit 3 receives battery voltage VB input thereto, boosts the battery voltage VB, and charges the charging capacitor 3a as a charging unit with a boost voltage Vboost. The boost control unit 5a boost-controls the battery voltage VB input to the booster circuit 3 by applying a boost control pulse to the switching element M1. The boost control unit 5a detects the boost voltage Vboost of the charging capacitor 3a of the boost circuit 3 by the voltage detection unit 3aa, charges it to the boost completion voltage Vfull, and supplies it to the drive circuit 6. The charging capacitor 3a holds power to be supplied to the fuel injection valves 2 which directly inject fuel into the respective cylinders #1 to #4.

The battery voltage VB and the boost voltage Vboost are input to the drive circuit 6. Although not illustrated, the drive circuit 6 includes, for example, a transistor for applying the boost voltage Vboost to the solenoid coils 2a of the fuel injection valves 2 of the cylinders #1 to #4, a transistor for applying the battery voltage VB to the solenoid coils 2a, and a cylinder selection transistor which selects the cylinder to be energized.

The drive circuit 6 selectively applies the boost voltage Vboost or the battery voltage VB to the solenoid coil 2a of the fuel injection valve 2 of each cylinder in accordance with energization control of the energization control unit 5b of the control IC 5, thereby driving the fuel injection valve 2 to cause the fuel injection valve 2 to inject fuel. When the energization control unit 5b causes the fuel injection valve 2 to perform partial-lift injection through the drive circuit 6, the energization control unit 5b executes an injection process of applying the boost voltage Vboost to the solenoid coil 2a of the fuel injection valve 2 and closing the fuel injection valve 2 before the valve is completely opened. When the fuel injection valve 2 performs normal injection, the energization control unit 5b applies the boost voltage Vboost to the solenoid coil 2a of the fuel injection valve 2 through the drive circuit 6 and then applies the battery voltage VB thereto to perform constant current control, and stops the energization after the elapse of the energization command time Ti. Accordingly, at the normal injection, an injection process of closing the fuel injection valve 2 after the valve is completely opened is executed.

The current detector 7 includes a current detection resistor connected to an energization path of the solenoid coil 2a of the fuel injection valve 2 of each of the cylinders #1 to #4. The current monitoring unit 5c of the control IC 5 includes, for example, a comparator and an A/D converter (both of which are not illustrated), and monitors a current flowing through the fuel injection valve 2 by the current detector 7.

Figure 3:
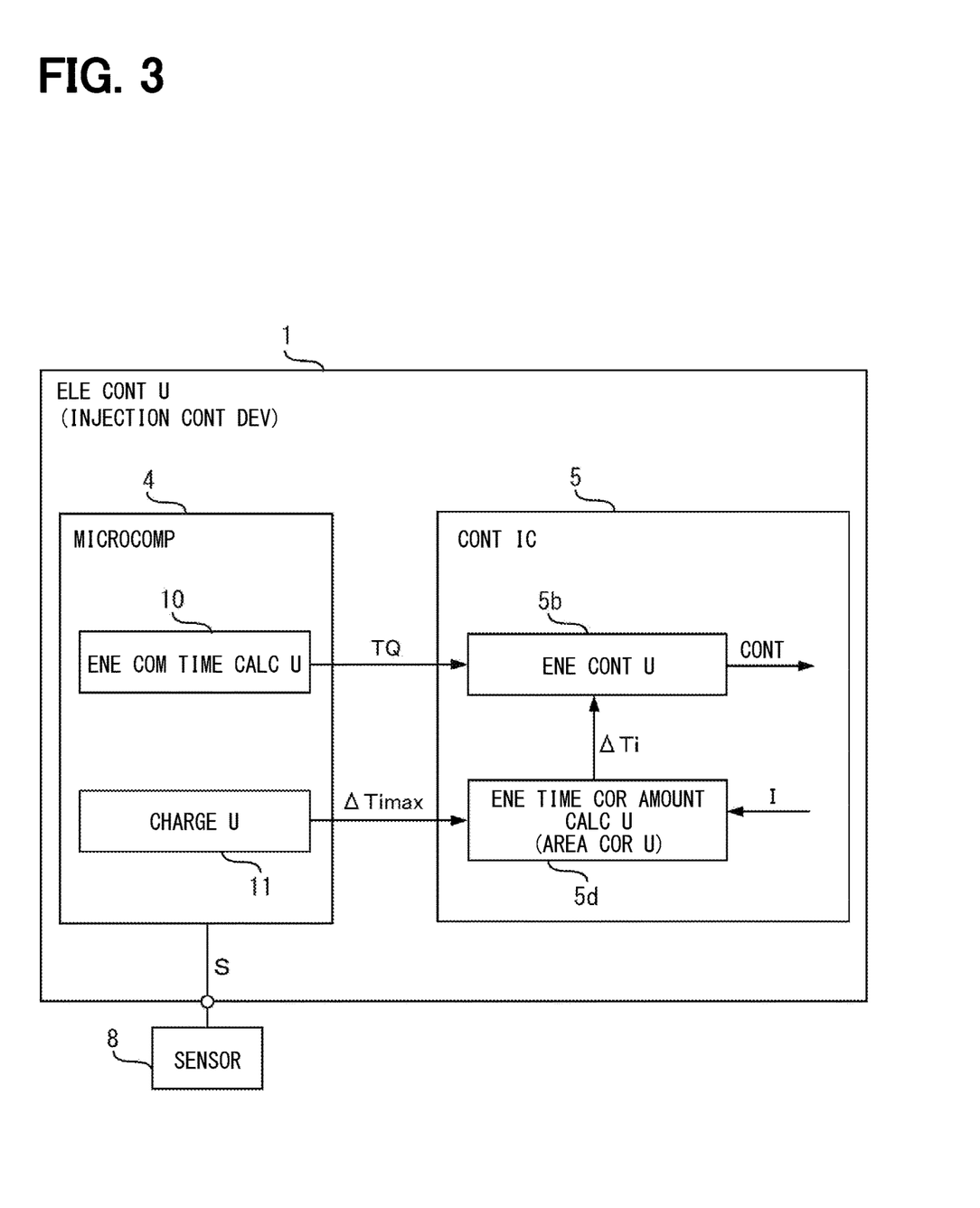
FIG. 3 is a functional configuration diagram of a microcomputer and a control IC.

FIG. 3 schematically illustrates the functional configuration of the microcomputer 4 and the control IC 5. The microcomputer 4 operates as the energization command time calculation unit 10 and the change unit 11 when the core 4a executes the program stored in the memory 4b. The control IC 5 also has a function of an energization time correction amount calculation unit 5d serving as the area correction unit in addition to the functions of the boost control unit 5a, the energization control unit 5b, and the current monitoring unit 5c described above.

The change unit 11 has a function of changing the upper limit guard value ΔTimax of the energization time correction amount ΔTi according to the injection times during multi-stage injection control, and sets the upper limit guard value ΔTimax to output it to the energization command time calculation unit 10 of the control IC 5.

The energization command time calculation unit 10 calculates, at the start of injection control, the required injection quantity on the basis of the sensor signals S of the various sensors 8 and calculates the energization command time Ti of the instruction TQ. The energization command time Ti of the instruction TQ indicates a time for which an instruction to apply voltage to the fuel injection valve 2 is provided in injection control. The instruction TQ is given to the energization control unit 5b of the control IC 5.

When the instruction TQ is input, the energization control unit 5b of the control IC 5 controls the peak current by energizing the fuel injection valve 2 with the boost voltage Vboost from the drive circuit 6. On the other hand, when the energization control unit 5b current-drives the fuel injection valve 2 to cause the fuel injection valve 2 to inject fuel, the energization time correction amount calculation unit 5d of the control IC 5 acquires a current flowing through the fuel injection valve 2 and performs area correction on the current, thereby acquiring an energization time correction amount ΔTi.

The energization time correction amount calculation unit 5d feeds back the calculated energization time correction amount ΔTi to the energization control unit 5b. The energization control unit 5b energizes the fuel injection valve 2 by reflecting the energization time correction amount ΔTi in real time with respect to the energization command time Ti of the input instruction TQ.

Outline of Area Correction Control Performed by Control IC 5

Here, first, the contents of the area correction control by the control IC 5 at the time of partial lift injection will be roughly described. When the battery voltage VB is applied to the electronic control unit 1, the microcomputer 4 and the control IC 5 are activated. The boost control unit 5a of the control IC 5 boosts the voltage of the charging capacitor 3a of the booster circuit 3 by outputting the boost control pulse to the booster circuit 3. The charging capacitor 3a is charged with the boost voltage Vboost up to a predetermined boost completion voltage Vfull exceeding the battery voltage VB.

Typically, the energization command time calculation unit 10 of the microcomputer 4 calculates the required injection quantity and calculates the instruction TQ at the injection start instruction time t0 of the peak current control, and outputs the instruction TQ to the energization control unit 5b of the control IC 5. That is, the microcomputer 4 outputs the energization command time Ti to the control IC 5 through the instruction TQ.

The control IC 5 stores, in an internal memory, the nominal current profile PI serving as a target current for the energization current EI and continues peak current control so that the energization current EI reaches a peak current $I_{pk}$ serving as a target by applying the boost voltage Vboost to the fuel injection valve 2 on the basis of the nominal current profile PI under control of the energization control unit 5b.

Figure 4:
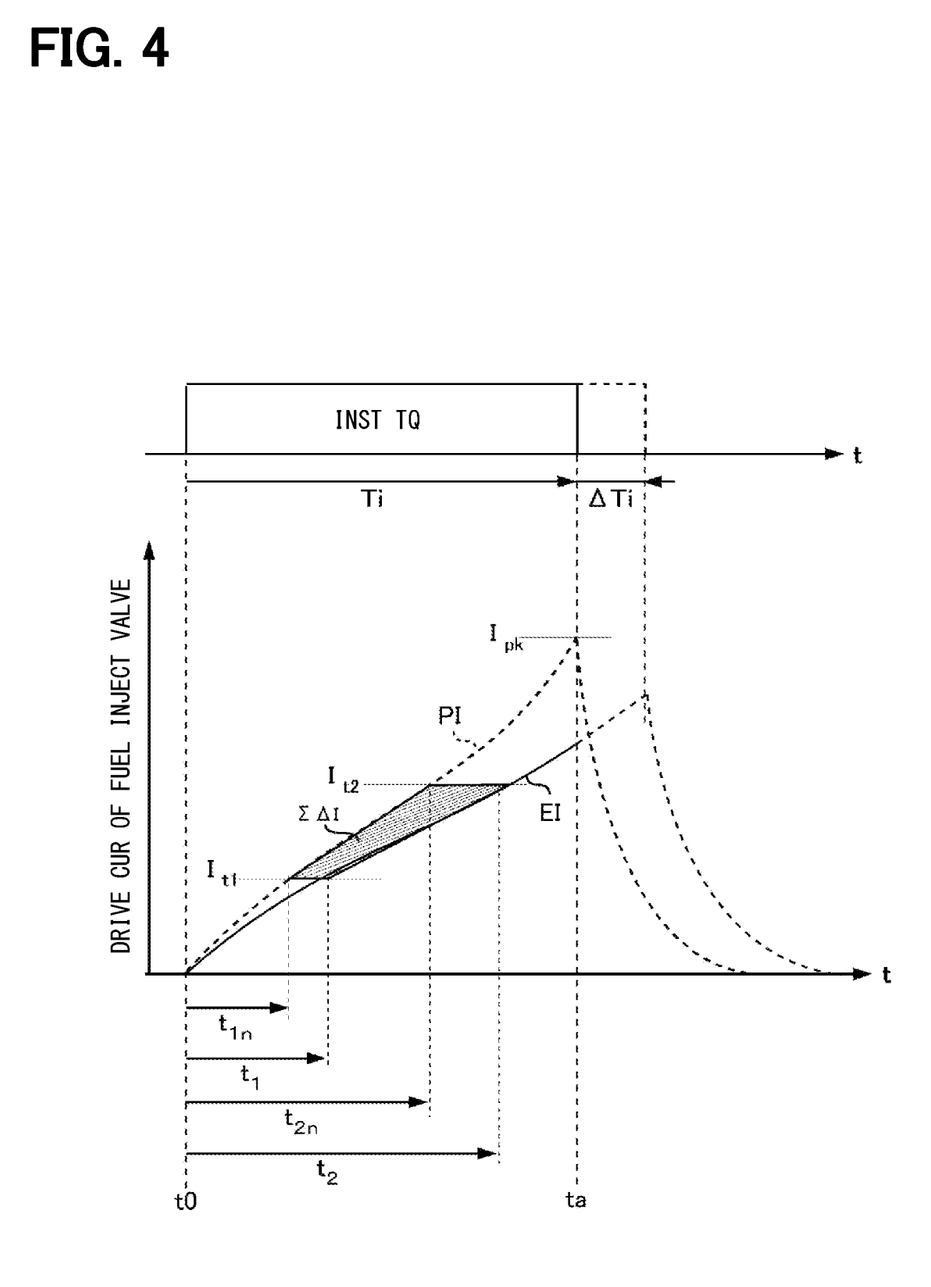
FIG. 4 is an explanatory diagram illustrating a method for calculating an integrated current difference.

The control IC 5 continuously applies the boost voltage Vboost to between terminals of the fuel injection valve 2 until the energization current EI reaches the peak current $I_{pk}$ indicated by the nominal current profile PI on the basis of the energization command time Ti of the instruction TQ. The energization current EI of the fuel injection valve 2 rapidly increases to open the fuel injection valve 2. As illustrated in FIG. 4, the energization current EI of the fuel injection valve 2 nonlinearly varies on the basis of the structure of the fuel injection valve 2. The gradient of the energization current EI becomes lower than the gradient of the nominal current profile PI due to various factors such as a peripheral temperature environment and aged deterioration, and the actual injection quantity becomes smaller than the normal injection quantity based on the nominal current profile PI.

Under the condition that the boost voltage Vboost is lower than the predetermined voltage Vsta at the injection control start timing, the control IC 5 executes the area correction control by the energization time correction amount calculation unit 5d to calculate the energization time correction amount $\Delta Ti$, and executes the feedback control in real time for energization control unit 5b. Specifically, the energization time correction amount calculation unit 5d calculates and corrects the integrated current difference between the normal current profile PI and the energization current EI that energizes the fuel injection valve 2.

The integrated current difference corresponds to an area surrounded by nonlinear current curves. Thus, in order to calculate the integrated current difference in detail, an operation load tends to increase. Thus, as illustrated in FIG. 4 and represented by Equation (1), the area of a trapezoid with vertices (t, I)=$(t_{1n}, I_{t1})$, $(t_1, I_{t1})$, $(t_{2n}, I_{t2})$, $(t_2, I_{t2})$ may be regarded as the integrated current difference $\Sigma\Delta I$ dependent on the area surrounded by the nonlinear current curves for simple calculation.

[Equation 1]

$$\Sigma\Delta I = \{(t_1 - t_{1n}) + (t_2 - t_{2n})\} \times (I_{t2} - I_{t1}) \div 2 \quad (1)$$

The energization time correction amount calculation unit 5d calculates the integrated current difference $\Sigma\Delta I$ between the nominal current profile PI from ideal arrival time $t_{1n}$ to reach a current threshold $I_{t1}$ to ideal arrival time $t_{2n}$ to reach a current threshold $I_{t2}$ and the energization current EI of the fuel injection valve 2 from arrival time $t_1$ to actually reach the current threshold $I_{t1}$ to arrival time $t_2$ to actually reach the current threshold $I_{t2}$. This enables the energization time correction amount calculation unit 5d to simply calculate the integrated current difference $\Sigma\Delta I$ by detecting the arrival time $t_1$ to reach the current threshold $I_{t1}$ and the arrival time $t_2$ to reach the current threshold $I_{t2}$.

The energization time correction amount calculation unit 5d calculates an energy shortage Ei by multiplying the integrated current difference $\Sigma\Delta I$ by a correction coefficient $\alpha$ input thereto from the energization command time calculation unit 10 as represented by Equation (2).

[Equation 2]

$$Ei = \Sigma\Delta I \times \alpha = \{(t_1 - t_{1n}) + (t_2 - t_{2n})\} \times (I_{t2} - I_{t1}) \div 2 \times \alpha \quad (2)$$

Figure 5:
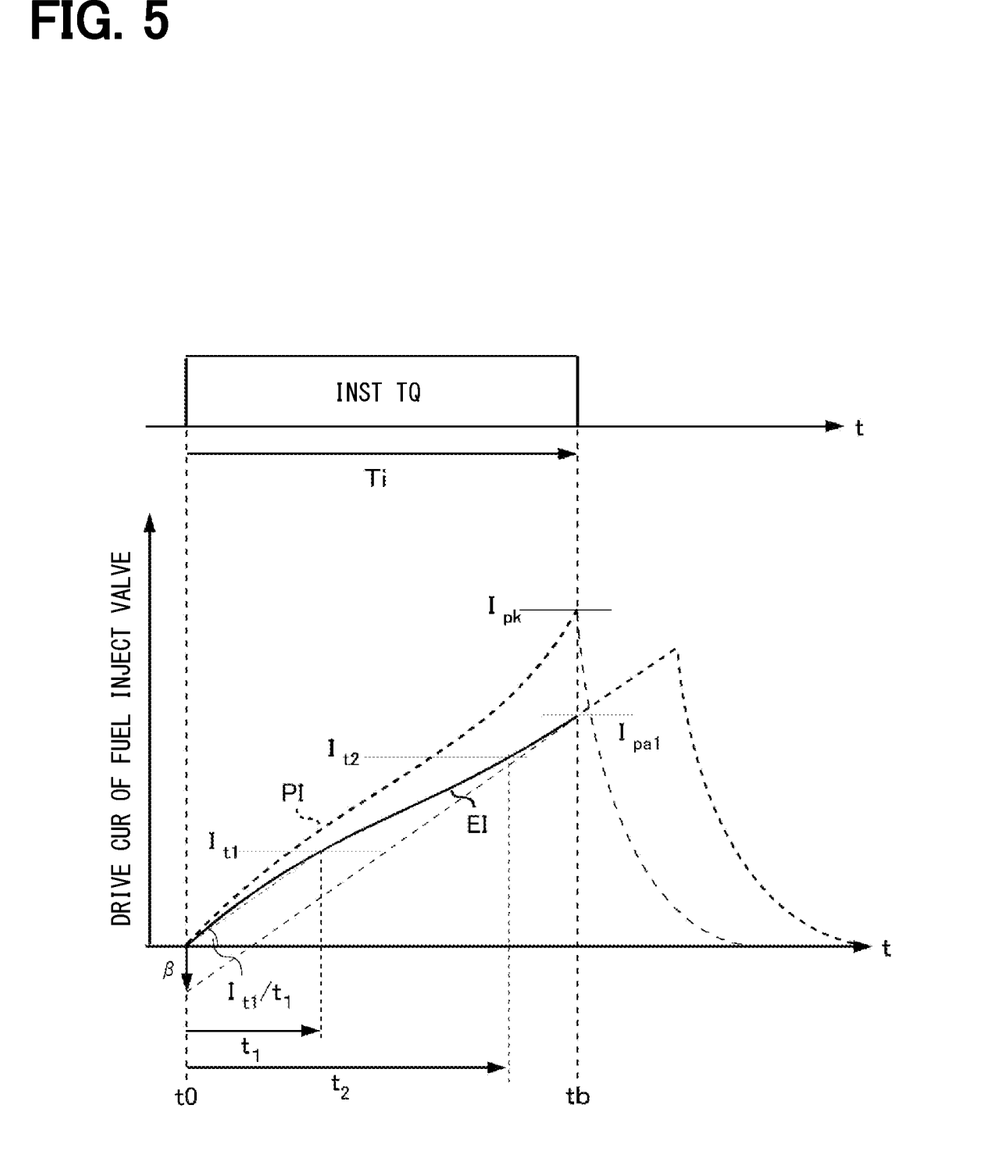
FIG. 5 is an explanatory diagram illustrating a method for calculating a peak current estimation value.

The correction coefficient $\alpha$ is used to estimate, from the area of the trapezoid, the energy shortage Ei dependent on an actual integrated current difference and previously calculated according to, for example, the load characteristic of the fuel injection valve 2. As illustrated in FIG. 5, the energization time correction amount calculation unit 5d calculates a peak current estimation value $I_{pa1}$ at a point in time when the energization command time Ti indicated by the instruction TQ elapses by calculating a current gradient from the injection start instruction time $t_0$ to the arrival time $t_i$ to reach the current threshold $I_{t1}$ and adding a correction coefficient $\beta$ thereto as an intercept. At this time, the peak current estimation value $I_{pa1}$ may be calculated using Equation (3).

[Equation 3]

$$I_{pa1} = \frac{I_{t1}}{t_1} \times Ti + \beta \quad (3)$$

The correction coefficient $\beta$ indicates an offset term for accurately estimating the peak current estimation value $I_{pa1}$ at application OFF timing of the voltage and is previously calculated according to, for example, the load characteristic of the fuel injection valve 2. Although the current gradient from the injection start instruction time $t_0$ to the arrival time $t_1$ to reach the current threshold $I_{t1}$ is used in the first term of Equation (3), a current gradient from the injection start instruction time to to the arrival time $t_2$ to reach the current threshold $I_{t2}$ may be used in the first term of Equation (3).

Next, the energization time correction amount calculation unit 5d calculates the energization time correction amount $\Delta Ti$ for compensating for the energy shortage Ei. Specifically, as represented by Equation (4), the energization time correction amount calculation unit 5d calculates the energization time correction amount $\Delta Ti$ by dividing the calculated energy shortage Ei by the estimated peak current estimation value $I_{pa1}$.

[Equation 4]

$$\begin{aligned}\Delta Ti &= Ei \div I_{pa1} \\ &= \frac{\{(t_1 - t_{1n}) + (t_2 - t_{2n})\} \times (I_2 - I_1) \div 2 \times \alpha}{\frac{I_{t1}}{t_1} \times Ti + \beta} \\ &= \frac{\{(t_1 - t_{1n}) + (t_2 - t_{2n})\} \times (I_2 - I_1) \times \alpha 2 \times t_1}{\{I_{t1} \times Ti\} + \beta \times t_1}\end{aligned} \quad (4)$$

In this equation (4), α2 represents α/2. It is possible to simply calculate an extension time for compensating for the energy shortage Ei and dramatically reduce an operation amount by deriving the energization time correction amount ΔTi using Equation (4) dependent on the energy shortage Ei and the peak current estimation value $I_{pa1}$.

When the energization time correction amount calculation unit 5d outputs the calculated energization time correction amount ΔTi to the energization control unit 5b, the energization control unit 5b corrects the energization command time Ti to an energization command time Ti of the instruction TQ+the energization time correction amount ΔTi as an effective energization command time by timing tb when a current I detected by the current monitoring unit 5c reaches the peak current estimation value $I_{pa1}$. This makes it possible to simply correct the energization command time Ti of the instruction TQ and extend the actual energization time.

Such a method eliminates the necessity of previously adjusting the energization command time Ti factoring in variations to prevent accidental fire and makes it possible to take measures against accidental fire while minimizing reduction in the fuel efficiency. In addition, it is not necessary to calculate the integrated current difference in real time during injection control, and the amount of calculation can be reduced.

The energization time correction amount calculation unit 5d calculates the energization time correction amount ΔTi in a period from when the current I reaches the last current threshold $I_{t2}$ to when the current I reaches the peak current estimation value $I_{pa1}$. Thus, the energization command time Ti can be corrected with sufficient time. Although a mode in which the energization time correction amount ΔTi is calculated using Equations (1) to (4) has been described, these equations merely show an example, and the present invention is not limited to this method.

Figure 6:
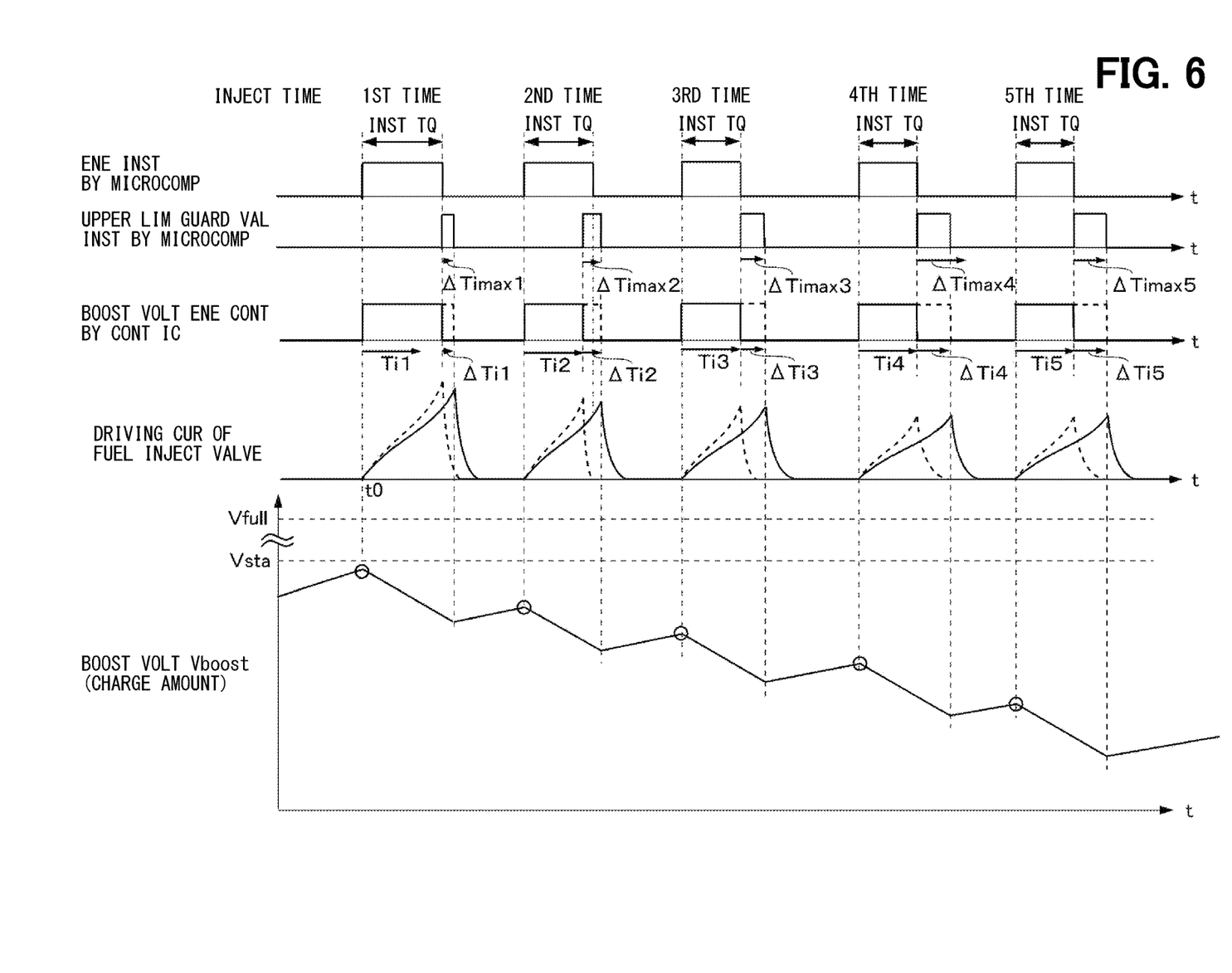
FIG. 6 is a timing chart schematically showing changes in a set value of an upper limit guard value, a calculated value of an energization time correction amount, a driving current of a fuel injection valve, and a boosted voltage.

Hereinbelow, processing details of the microcomputer 4 which executes main control using the control IC 5 as described above will be described. As described above, the control IC 5 calculates and corrects the energization time correction amount ΔTi because the energization current EI tends to decrease with respect to the normal current profile PI. In particular, during multi-stage injection control of fuel, as illustrated in FIG. 6, the charge amount of the boost voltage Vboost of the charging capacitor 3a of the booster circuit 3 decreases each time the fuel is injected. The boost control unit 5a continues the boost control of the boost voltage Vboost during this period, but the increase in the boost voltage Vboost cannot catch up.

Therefore, at the time of multi-stage injection control, the current inclination of the energizing current EI tends to be duller in the late injection than in the early injection. Therefore, the microcomputer 4 makes the upper limit guard value ΔTimax of the energization time correction amount ΔTi variable according to the injection times during multi-stage injection control by the function of the change unit 11, and it may be preferable to calculate the upper limit guard value ΔTimax of the energization time correction amount ΔTi suitable for each injection time and to command the control IC 5.

As a specific example, FIG. 6 illustrates an example of setting the upper limit guard value ΔTimax of the energization time correction amount ΔTi in, for example, 5-stage injection. At this time, the changing unit 11 of the microcomputer 4 may make the upper limit guard value ΔTimax of the energization time correction amount ΔTi in the latter injection time longer than that of the former injection time.

From another point of view, the change unit 11 of the microcomputer 4 may set at least the upper limit guard value ΔTimax5 of the final round during multi-stage injection control to be longer than the upper limit guard values ΔTimax1, ΔTimax2, ΔTimax3, and ΔTimax4 of the other injection rounds. Further, it may be preferable that the change unit 11 of the microcomputer 4 may gradually lengthen the upper limit guard value ΔTimax in the subsequent injection time as compared with the earlier injection time.

In the example of FIG. 6, the microcomputer 4 sets the upper limit guard value ΔTimax of the energization time correction amount ΔTi longer each time the injection times have been passed, and sets the upper limit guard values ΔTimax1 to ΔTimax5 to satisfy the relationship of "ΔTimax1<ΔTimax2<ΔTimax3<ΔTimax4<ΔTimax5". At this time, for example, "ΔTimax1=50 μsec, ΔTimax2=60 μsec, ΔTimax3=70 μsec, ΔTimax4=80 μsec, and ΔTimax5=90 μsec" may be set.

It may not be necessary to set the upper limit guard value ΔTimax which is different from each other according to the injection times.

The upper limit guard value ΔTimax may be the same value for the subsequent injection times and the starting injection times. For example, "ΔTimax1=50 μsec, ΔTimax2=60 μsec, ΔTimax3=60 μsec, ΔTimax4=80 μsec, and ΔTimax5=90 μsec" may be set.

When the microcomputer 4 sets the upper limit guard value ΔTimax of the energization time correction amount ΔTi according to the injection times, the control IC 5 does not calculate the energization time correction amount ΔTi in an amount exceeding this upper limit guard value ΔTimax, and it is possible to prevent the IC 5 from executing excessive area correction during multi-stage injection control.

In the example shown in FIG. 6, the n-th upper limit guard values ΔTimax1, ΔTimax2, ΔTimax3, ΔTimax4, and ΔTimax5 match the n-th energization time correction amounts ΔTi1, ΔTi2, ΔTi3, ΔTi4, and ΔTi5. By dynamically changing the upper limit guard value ΔTimax of the energization time correction amount ΔTi in this way, the microcomputer 4 can prevent excessive area correction during multi-stage injection control.

Other Embodiments

The present disclosure should not be limited to the embodiments described above, and various modifications may further be implemented without departing from the gist of the present disclosure. For example, the following modifications or extensions are possible. The embodiments described above may be combined as necessary.

Although the mode in which the microcomputer 4 and the control IC 5 are configured as separate integrated circuits has been described, the microcomputer 4 and the control IC 5 may be integrated with each other. In this case, it is preferable to use a high-speed processor.

In the above embodiments, the present invention is applied to direct injection that directly injects fuel into a combustion chamber of the internal combustion engine. However, the present invention is not limited thereto and may be applied to port injection that injects fuel in front of a known intake valve.

Although the above embodiments describe the mode in which the control IC 5 simply calculates the integrated current difference 7-AI by calculating the area of the trapezoid of the energization current EI of the fuel injection valve 2, the present invention is not limited thereto. The energization current EI of the fuel injection valve 2 nonlinearly varies both before and after reaching the peak current $I_{pk}$. Thus, it is preferable to simply calculate the integrated current difference by approximately calculating the integrated current using a polygon such as a triangle, a rectangle, or a trapezoid. This makes it possible to dramatically reduce the operation amount.

The means and/or the functions provided by the microcomputer 4 and the control IC 5 can be provided by software recorded in a substantive memory device and a computer executing the software, software only, hardware only, or a combination thereof. For example, when the control device is provided by an electronic circuit as hardware, the control device can include a digital circuit including one or more logic circuits or an analog circuit. Further, for example, when the control device executes various control operations using software, a program is stored in the storage unit, and the control main body executes the program to implement a method corresponding to the program.

The controller and the method described in the present disclosure may be implemented by a dedicated computer including a processor programmed to execute one or more functions embodied by a computer program and a memory. Alternatively, the controller and the method described in the present disclosure may be implemented by a dedicated computer including a processor including one or more dedicated hardware logic circuits. Alternatively, the controller and the method described in the present disclosure may be implemented by one or more dedicated computers including the combination of a processor programmed to execute one or more functions and a memory and a processor including one or more hardware logic circuits. The computer program may be stored, as an instruction executed by a computer, in a computer-readable non-transitory tangible storage medium.

The embodiments described above may be combined. In addition, the reference numerals in parentheses described in the claims simply indicate correspondence to the concrete means described in the embodiments, which is an example of the present disclosure. That is, the technical scope of the present invention is not necessarily limited thereto. A part of the above-described embodiment may be dispensed/dropped as long as the problem identified in the background is resolvable. Any aspects conceivable within the nature of the invention specified by wordings described in claims can also be regarded as embodiments.

The present invention has been described in accordance with the embodiment described above. However, it is to be understood that the present invention is not limited to the embodiment and structure. The present disclosure encompasses various modifications and variations within the scope of equivalents. In addition, various modes/combinations, one or more elements added/subtracted thereto/therefrom, may also be considered as the present disclosure and understood as the technical thought thereof.

In the drawings, 1 is an electronic control device (injection control device), 2 is a fuel injection valve, 5b is an area correction unit, 10 is an energization command time calculation unit, and 11 is a change unit.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as a step. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An injection control device comprising:
an area correction unit that calculates an energization time correction amount by performing area correction of a current flowing through a fuel injection valve when executing a current drive of a fuel injection valve to inject a fuel from the fuel injection valve in a multi-stage injection; and
a change unit that changes an upper limit guard value of the energization time correction amount according to an injection time of the multi-stage injection during control of the multi-stage injection.

2. The injection control device according to claim 1, wherein:
the change unit sets the upper limit guard value of the energization time correction amount in a later injection time to be longer than an earlier injection time in the multi-stage injection.

3. The injection control device according to claim 2, wherein:
the change unit gradually increases the upper limit guard value of the energization time correction amount in the later injection time from the earlier injection time in the multi-stage injection.

4. The injection control device according to claim 1, wherein:
the change unit sets the upper limit guard value of the energization time correction amount in a later injection time to be equal to an earlier injection time in the multi-stage injection.

5. The injection control device according to claim 1, wherein:
the change unit sets at least the upper limit guard value of the energization time correction amount in a final injection time to be longer than an other injection time in the multi-stage injection.

6. The injection control device according to claim 1, further comprising:
  one or more processors; and
  a memory coupled to the one or more processors and storing program instructions that when executed by the one or more processors cause the one or more processors to provide at least: the area correction unit; and the change unit.

* * * * *